United States Patent [19]

Arai et al.

[11] Patent Number: 4,794,044

[45] Date of Patent: Dec. 27, 1988

[54] METHOD FOR SURFACE TREATMENT

[75] Inventors: Tohru Arai; Hatsuhiko Oikawa, both of Aichi, Japan

[73] Assignee: Kabushiki Kaisha Toyota Chuo Kenkyusho, Japan

[21] Appl. No.: 130,802

[22] Filed: Dec. 8, 1987

[30] Foreign Application Priority Data

Dec. 10, 1986 [JP] Japan ................................ 61-294282

[51] Int. Cl.$^4$ .......................................... C04B 41/81
[52] U.S. Cl. .................................. 427/431; 427/399
[58] Field of Search ............................. 427/399, 431

[56] References Cited

FOREIGN PATENT DOCUMENTS 2417919 10/1974 Fed. Rep. of Germany ...... 421/399

Primary Examiner—Sam Silverberg
Attorney, Agent, or Firm—Berman, Aisenberg & Platt

[57] ABSTRACT

A method for forming a layer of a carbide or nitride of a metallic element or boron nitride on the surface of a ceramics article. A molten salt bath is prepared by heating and melting a bath agent composed of boron oxide and/or borate, and at least one metallic element selected from Group IVa, Va, VIa elements, etc. An article to be treated which is made of silicon nitride, silicon carbide or sialon is immersed in the salt bath. This method provides a ceramics product with a uniform surface layer having superior frictional and electrical properties.

21 Claims, 8 Drawing Sheets (x 2400)

(x 2400)

(x 2400)

(x 1600)

(×1600)

(×2200)

(×1600)

(×1600)

BN

Si₃N₄

(×1600)

BN

Si₃N₄

(×1600)

BN

Si₃N₄

(×1600)

BN

Si₃N₄

(×1600)

(×1600)

(×1600)

(×2800)

(×600)

(×1800)

(×1600)

(×600)

METHOD FOR SURFACE TREATMENT

BACKGROUND OF THE INVENTION

1. Field of the Invention:

The present invention relates to a method for forming a surface layer of a carbide or nitride of a metallic element, such as vanadium, niobium, and chromium, or boron nitride on the surface of ceramics, such as silicon nitride ($Si_3N_4$) and silicon carbide (SiC).

2. Related Art Statement:

Nowadays, specialty ceramics, such as silicon nitride and silicon carbide, are attracting public attention because of their outstanding physical properties and functions. Despite their high strength and high heat resistance, they lack toughness and they still have much room for improvement in mechanical properties, such as frictional properties and thermal impact resistance.

Ceramics are required to have more functions if they are to find use as electronic parts. Further, ceramic are expected to be a structural material, but there is a limit to increasing the density of ceramics products because they are made by sintering. So, it has been desired to produce denser ceramics with improved mechanical and physical properties.

There has been proposed to overcome the above-mentioned disadvantages of ceramics the modification of ceramic surfaces or the coating of ceramic surfaces with ceramic of similar or dissimilar kind. Related arts include Japanese Patent Publication Nos. 153757/1979 and 145088/1982 for extending tool life by the coating of ceramic surfaces with a metal nitride, carbide, or oxide; Japanese Patent Publication No. 71581/1985 for improving lubrication properties at high temperatures by the coating of ceramic surfaces with ceramics; and Japanese Patent Publication No. 29463/1985 covering the coating of ceramic surfaces with superconducting NbN. According to these related arts, the coating of ceramics is accomplished by the PVD process (physical vapor phase deposition), CVD process (chemical vapor phase deposition), or plasma jet process. These processes require a large-scale apparatus and much labor, and they do not form a uniform coating depending on the shape of an article to be treated.

SUMMARY OF THE INVENTION

The present invention was completed to eliminate the above-mentioned disadvantages involved in the related arts. It is an object of the present invention to provide a method for providing a ceramic product with a uniform surface layer having superior frictional properties and electrical properties in a simple manner irrespective of the shape and quantity of products.

According to the present invention, the method for surface treatment comprises the steps of preparing a molten salt bath by heating and melting a bath agent comprising boron oxide and/or borate and at least one material selected from metallic elements and substances containing at least one of the metallic elements, the metallic elements being Group IVa elements, Group Va elements, Group VIa elements, calcium, manganese, boron, aluminum, silicon, magnesium, and rare earth elements, and immersing an article made of silicon nitride, silicon carbide, or sialon in the molten salt bath, thereby forming a surface layer of a carbide or nitride of the metallic elements or boron nitride on the surface of the article.

DETAILED DESCRIPTION OF THE INVENTION

Figure 1:
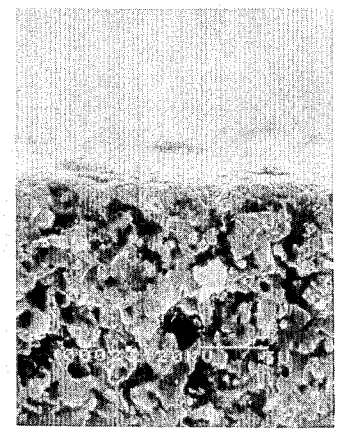
FIGS. 1 to 19 are SEM photographs showing the sectional structure of the surface layer formed by the surface treatment according to the present invention.

According to the present invention, the molten salt bath is used to provide a layer on the surface of an article to be treated. It is composed mainly of boron oxide ($B_2O_3$) or borate or both and at least one of metallic elements and substances containing at least one of the metallic elements. The borate includes anhydrous borax ($Na_2B_4O_7$), anhydrous potassium borate ($K_2B_4O_7$), and anhydrous lithium borate ($Li_2B_4O_7$). They are used alone or in combination with one another.

The metallic elements include Group IVa elements, Group Va elements, Group VIa elements, calcium, manganese, boron, aluminum, silicon, magnesium, and rare earth elements. They are used alone or in combination with one another. They are used in the form of a simple substance or a metal-containing substance. Examples of the metal-containing substance include alloys (such as ferro alloy), oxides, and halides. They are used alone or in combination with one another. If the metallic element is boron, it is used in the form of boron (as a simple substance), ferro boron (Fe-B), nickel boron (Ni-B), boron carbide ($B_4C$), or boron halide (such as $KBF_4$). The oxides are limited to those of Group Va elements and chromium.

In the case where the metal-containing substance is an oxide, a reducing agent is added to the oxide to facilitate the reduction of the oxide to a metallic element. Examples of the reducing agent include oxygen-free calcium, aluminum, silicon, titanium, zirconium, manganese, boron, magnesium, and rare earth elements, and compounds thereof. They are used alone or in combination with one another.

The molten salt bath is formed by heating and melting a bath agent composed of boron oxide or a borate or both, and at least one of metallic elements and substances containing at least one of the metallic elements. The incorporation of the metallic element or metallic element-containing substance into the molten salt bath may be accomplished by anodic electrolysis.

The amount of at least one of metallic elements and metallic element-containing substances to be added to the molten salt bath should preferably be 1 to 50 wt %, practically 5 to 30 wt %, based on the total amount of the bath agent in the case where no reducing agent is added. However, in the case where an oxide of a metallic element is added together with a reducing agent, the total amount of the oxide and reducing agent should preferably be 1 to 60 wt % based on the total amount of the bath agent. With an addition less than the lower limit, the desired effect may not be produced; and with the addition in excess of the upper limit, the resulting bath may have a high viscosity and the desired coating layer may not be formed.

In the case where a surface layer other than boron nitride (BN) is formed by the use of a molten salt bath containing an oxide of a metallic element and a reducing agent, the amount of the reducing agent should preferably be 7 to 40 wt % based on the amount of the oxide if the reducing agent is boron, or the amount of the reducing agent should preferably be 20 to 95 wt % based on the amount of the oxide if the reducing agent is other than boron. If more reducing agent is added than specified above, no surface layer may be formed on articles of silicon carbide or a surface layer of boron nitride is formed on articles of silicon nitride. However, in the case where $Cr_2O_3$ is used as the oxide, a surface layer or boron nitride is formed regardless of the amount of the reducing agent added.

The above-mentioned molten salt bath may be incorporated with a halide, such as sodium chloride (NaCl), potassium chloride (KCl), and sodium fluoride (NaF), or an oxide, such as phosphorus oxide ($P_2O_5$), in order to lower the melting point of boron oxide or borate. In addition, the molten salt bath may be incorporated with a high-melting point inert substance, such as alumina ($Al_2O_3$) and zirconia ($ZrO_2$), in order to increase the viscosity of the molten salt. This is effective to prevent the bath agent from dripping from the article during the heat treatment, thereby preventing the article from oxidation. The amount of the high-melting point inert substance should be less than 10 wt % based on the total amount of the bath agent.

Articles to be treated include those of silicon nitride ($Si_3N_4$), silicon carbide (SiC), and sialon. Incidentally, sialon collectively refers to compounds composed of silicon, a metallic element (such as Al and Cu), oxygen, and nitrogen.

An adequate bath temperature is from 850° to 1100° C. when an article is immersed in the bath. With a bath temperature lower than 850° C., the bath has such a high viscosity that a uniform coating layer is not formed easily and the increased amount of bath agent sticks to the article and thus taken out of the bath as the article is removed from the bath. With a bath temperature higher than 1100° C., the article is deteriorated, the bath life becomes short, and the article is oxidated during cooling. The duration of immersing should be properly selected in the range of from 1 minute to 48 hours according to the desired thickness of the surface layer.

The surface layer formed by immersing is a single layer of a nitride of a metallic element, a carbide of a metallic element, or boron nitride. The surface layer may also be a composite layer or mixed layer (multiple layer). The type of the surface layer should be selected according to the kind of the metallic element and article.

In the case where the metallic element is vanadium or niobium or both and the article is silicon nitride or sialon, a surface layer composed of a nitride of said metallic element is formed. In the case where the metallic element is at least one selected from titanium, Group Va elements, and chromium, and the article is silicon carbide, a surface layer composed of a carbide of said metallic element is formed. In the case where the metallic element is at least one selected from Group IVa elements, tantalum, molybdenum, tungsten, chromium, calcium, manganese, boron, aluminum, silicon, magnesium, and rare earth elements, and the article is silicon nitride or sialon, a surface layer composed of boron nitride is formed.

The type of the surface layer that will be formed can be roughly predicted from the temperature-free energy diagram. However, it is impossible to predict from the free energy alone because conditions in the molten bath do not necessarily agree with the diagram, and some elements reduce boron oxide or borate to form a layer of boron nitride. After immersing, the article is washed with hot water to remove the bath agent.

According to the method of the present invention, it is possible to form a surface layer composed of a nitride or carbide of a metallic element or boron nitride on the surface of an article of silicon nitride, silicon carbide, or sialon by immersing the article in a molten salt bath. The thus formed surface layer improves the properties of the article. It has been well known that ceramic products decrease in strength due to corrosion when they are immersed in a molten salt bath. Contrary to this knowledge, the surface treatment according to the present invention improves the properties of the article by forming a surface layer of a specific element. Such an element is added to the molten salt bath and diffused into ceramics from the surface.

In the case where niobium is added to the molten salt bath (at 1000° C.), it is considered that the following reactions take place in the bath.

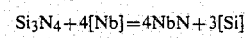

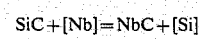

(Nb and Si in brackets indicate that they are present in the molten salt.)

As the equations indicate, the reactions are displacement reactions that take place between silicon and niobium (a metallic element to be diffused).

In the meantime, it is a well-known process to form a diffused layer of carbide on the surface of steel by immersing steel in a molten salt bath containing molten boron oxide or borate and a coating metal. (See Japanese Patent Publication Nos. 19844/1972, 38416/1974, and 4054/1978.) However, it has never been found that a layer of carbide or nitride is formed on the surface of ceramics. Usually, ceramics decrease in mechanical strength due to corrosion when immersed in molten boron oxide or borate. Contrary to this common knowledge, the surface treatment according to the present invention improves the mechanical and physical properties of ceramics. In addition, according to the present invention, it is possible to form a uniform layer on the surface of ceramics of silicon nitride, silicon carbide, or sialon using a molten salt bath without corrosion of the substrate.

The reaction that takes place in the surface treatment of the invention differs from the one that takes place in a conventional process for forming a surface layer on a steel article. According to the reaction that takes place in a conventional technology, carbon in steel combines with a coating metal in the bath to form a carbide layer on the surface. By contrast, according to the present invention, silicon in the article is displaced by the element in the bath, and this displacement forms a layer of nitride or carbide of comparatively high purity on the surface because the displaced silicon dissolves in the bath. The silicon which has dissolved in the bath acts as a reducing agent for the element oxidized in the bath, thereby extending the life of the bath.

Moreover, according to the present invention, it is possible to form a layer of nitride, such as NbN and BN, which has never been obtained where a steel article is used.

According to the present invention, the article for treatment is silicon nitride, silicon carbide, or sialon. It has the following advantages. (1) Unlike steel, silicon nitride, silicon carbide, or sialon is not subject to deformation and strain because of its low coefficient of thermal expansion even when it is treated at a high temperature. (2) The substrate does not decrease in strength when treated at temperatures employed in the invention, whereas steel substrate decreases in strength when heated due to loss of carbon and nitrogen. (3) The surface layer formed by treatment is more compact than the substrate, and it has good acid resistance.

The method of the present invention can be applied in a simple manner to form a surface layer without need of large-scale apparatus. The thus formed surface layer has many characteristic properties. It contributes to the improvement of electrical conductivity, electrical insulation properties, superconductivity, heat shock resistance, frictional properties, acid resistance, strength, etc. which are properties of the substrate of silicon nitride, silicon carbide, or sialon.

For example, a layer of nitride or carbide of vanadium or niobium, and a layer of carbide of chromium, tantalum, or titanium has a high electrical conductivity the substrate does not have. A layer of nitride of niobium exhibits superconductivity. A layer of nitride of boron has a low dielectric constant and a low dielectric loss and exhibits electrical insulating properties over a broad temperature range, and it also has high heat shock resistance and lubricity. A layer of nitride of niobium and a layer of carbide of vanadium, chromium, niobium, or titanium exhibit self-lubricity at high temperatures. In addition, a layer of nitride of vanadium, chromium, niobium, or boron formed on silicon nitride or sialon is compact and has a very high resistance to acid, such as HF.

EXAMPLES

The invention will be explained with reference to the following examples.

EXAMPLE 1

A crucible of heat-resisting steel containing anhydrous borax was heated in an electric furnace. Thus there was obtained a bath containing molten borax at 1000° C. The bath was incorporated with an additive in the form of powder (under 100–250 mesh) or flake. The kind and amount (based on the total amount of the bath agent) of the additive are shown in Tables 1 and 2. The thus prepared treating baths fall into two categories, one which is incorporated with a metal powder (such as Fe-V) and one which is incorporated with an oxide and reducing agent (such as $V_2O_5 + B_4C$).

In each of the treating baths thus prepared was immersed a rodlike test piece (measuring 3×4×40 mm) of silicon nitride or silicon carbide formed by sintering under normal pressure. After immersing for 6 hours, the test piece was air-cooled and washed with hot water to remove the treating agent. The treated test piece was examined by X-ray diffractometry to identify the coating layer. In addition, the fracture of the test piece was observed under a scanning electron microscope. Table 1 and FIGS. 1–14 show the results obtained for test pieces of silicon nitride, and Table 2 and FIGS. 15–19 show the results obtained for test pieces of silicon carbide.

The results indicate that a layer of nitride of vanadium, niobium, or boron was formed on the silicon nitride test piece, and a layer of carbide of vanadium, chromium, niobium, titanium, or tantalum was formed on the silicon carbide test piece. The coating layer was more compact than the substrate, the nitride coating layer was 3–5 μm thick and the carbide coating layer was 4–26 μm thick. In the case where vanadium, chromium, niobium, or tantalum was added, the resulting coating layer was the same regardless of the type of the bath (incorporated with metal powder or oxide plus reducing agent).

Figure 20:
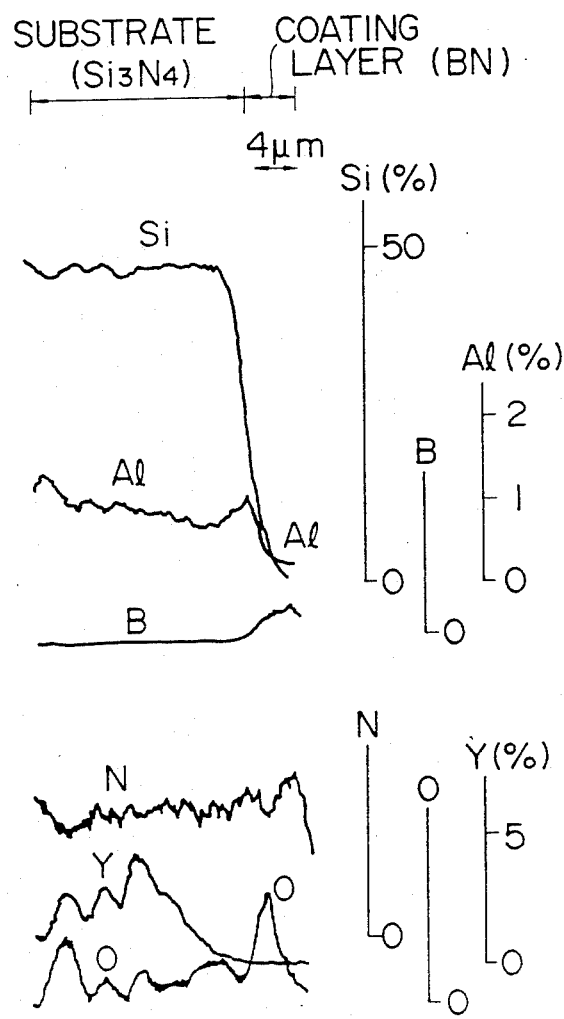
FIGS. 20 and 21 are diagrams showing the results of the analysis (EPMA) of the surface layer formed by the surface treatment in Example 1.
Figure 21:
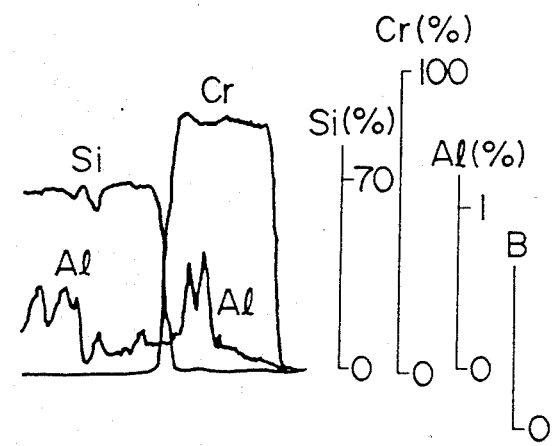
Figure 21:
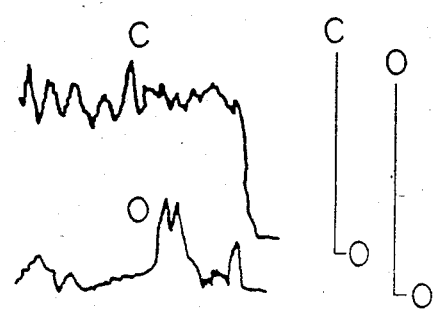

The cross-section of the surface layer of the sample Nos. 20 and 22 was examined by line analysis with an electron probe microanalyzer (EPMA). The results are shown in FIG. 20 (sample No. 20) and FIG. 21 (sample No. 22). It is noted from these figures that the element in the treating bath was displaced by silicon in the substrate and a nitride or carbide was formed. Since the displaced silicon diffuses through the coating layer and dissolves in the treating bath, it is present in a small amount in the coating layer but it has very little affect on the properties of the coating layer.

In the case where molybdenum was added (sample No. 8), boron diffused into the test piece of silicon nitride, forming a complex nitride of boron and silicon. In the case where titanium was added (sample No. 24), titanium diffused into the test piece of silicon carbide, forming a complex carbide of titanium and silicon.

Incidentally, the crystalline structure of the nitride or carbide formed by surface treatment varies depending on the treating temperature, treating time, bath composition, and kinds of substrates.

TABLE 1

Figure 2:
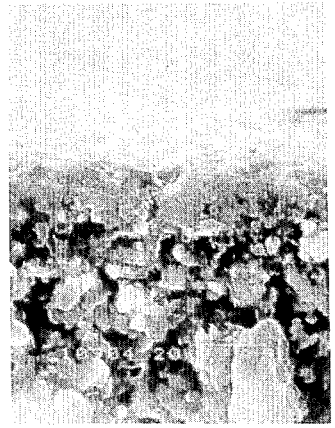
Figure 3:
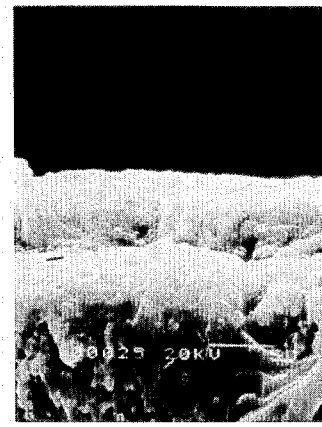
Figure 4:
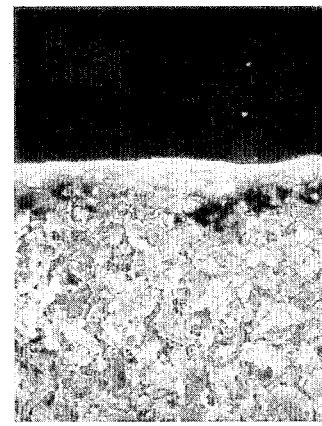
Figure 5:
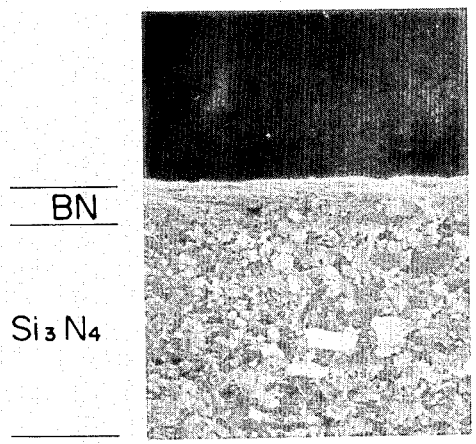
Figure 6:
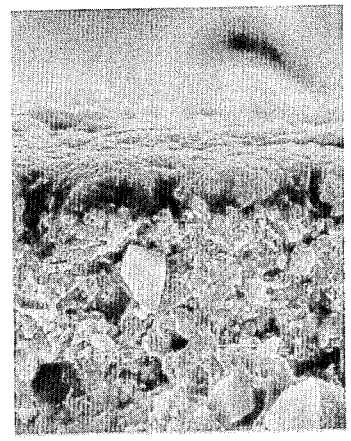
Figure 7:
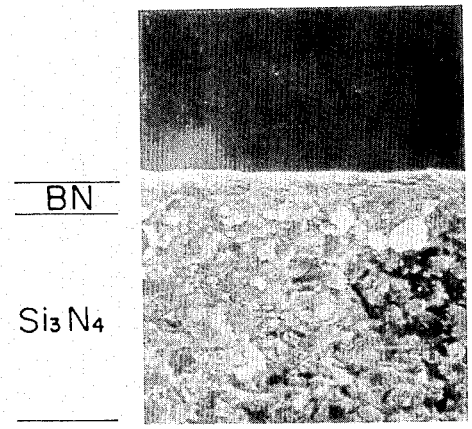
Figure 8:
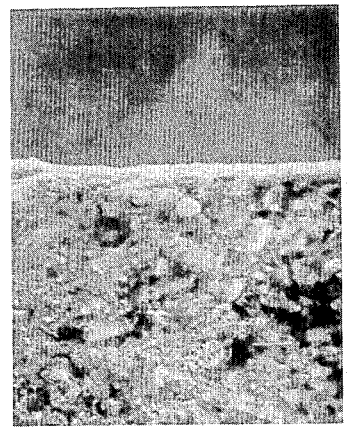
Figure 9:
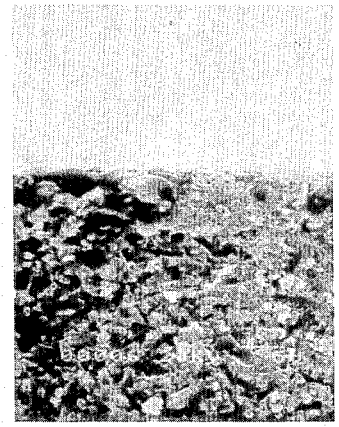
Figure 10:
Figure 11:
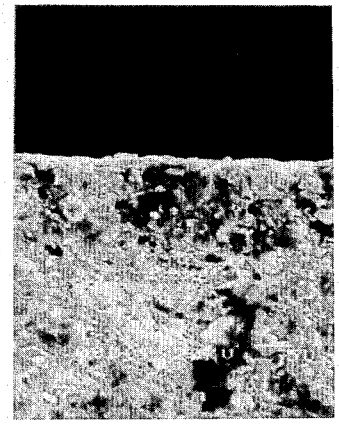
Figure 12:
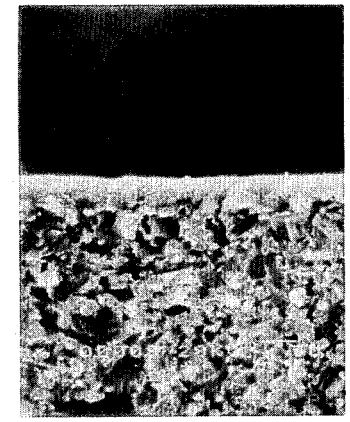
Figure 13:
Figure 14:
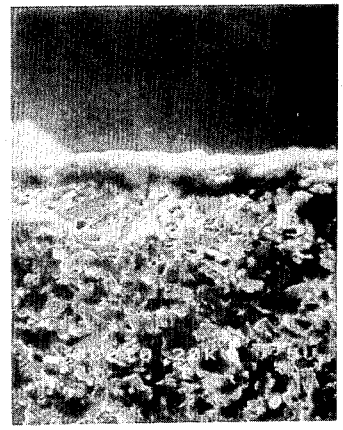

| Sample No. | Additive | Amount added (wt %) | Surface layer | Layer thickness (μm) | FIG. No. |
|---|---|---|---|---|---|
| 1 | Fe—V | 20 | VN | 3 | — |
| 2 | Cr | 20 | BN | 4 | — |
| 3 | Fe—Nb | 20 | NbN | 3 | FIG. 3 |
| 4 | Fe—Ti | 20 | BN | 5 | FIG. 4 |
| 5 | Fe—Zr | 20 | BN | 5 | FIG. 5 |
| 6 | Fe—B | 20 | BN | 5 | FIG. 6 |
| 7 | Fe—Mn | 20 | BN | 4 | FIG. 7 |
| 8 | Fe—Mo | 20 | $(Si,B)_3N_4$ | 4 | FIG. 8 |
| 9 | Fe—W | 20 | BN | 4 | FIG. 9 |
| 10 | Fe—Si | 20 | BN | 5 | FIG. 10 |
| 11 | Ca—Si | 20 | BN | 4 | FIG. 11 |
| 12 | Fe—Al | 20 | BN | 4 | FIG. 12 |
| 13 | Ta | 20 | BN | 5 | FIG. 13 |
| 14 | Hf | 20 | BN | 4 | FIG. 14 |
| 15 | $B_4C$ | 40 | BN | 5 | — |
| 16 | $V_2O_5$ $B_4C$ | 20 5 | VN | 3 | FIG. 1 |
| 17 | $Cr_2O_3$ Al | 20 5 | BN | 5 | FIG. 2 |
| 18 | $Nb_2O_5$ Al | 17 5 | NbN | 4 | — |
| 19 | $Ta_2O_5$ $B_4C$ | 20 3 | BN | 5 | — |
| 20 | Fe—Mn Fe—Al | 10 10 | BN | 5 | — |

TABLE 2

Figure 15:
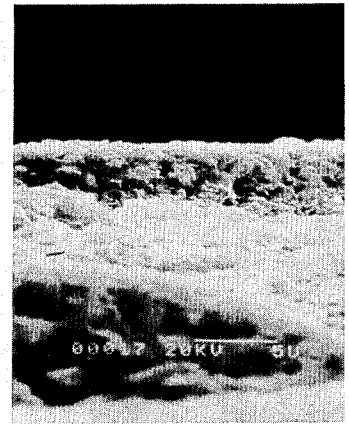
Figure 16:
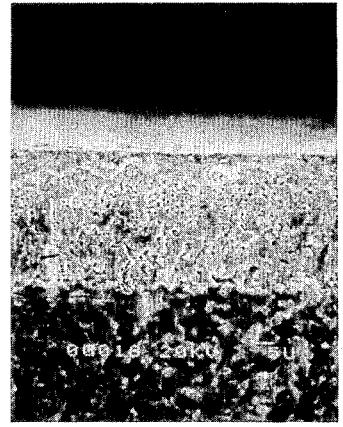
Figure 17:
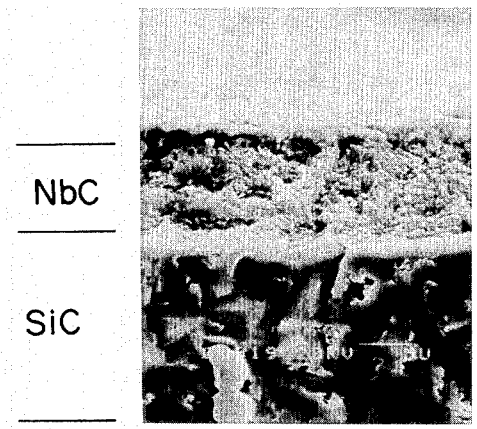
Figure 18:

| Sample No. | Additive | Amount added (wt %) | Surface layer | Layer thickness (μm) | FIG. No. |
|---|---|---|---|---|---|
| 21 | Fe—V | 20 | VC | 4 | FIG. 15 |
| 22 | Cr | 20 | $Cr_7C_3 + Cr_{23}C_6$ | 26 | FIG. 16 |
| 23 | Fe—Nb | 20 | NbC | 8 | FIG. 17 |
| 24 | Fe—Ti | 20 | (Si,Ti)C | 4 | FIG. 18 |

TABLE 2-continued

Figure 19:
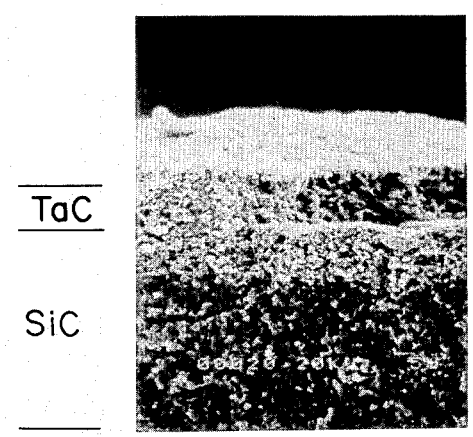

| Sample No. | Additive | Amount added (wt %) | Surface layer | Layer thickness (μm) | FIG. No. |
|---|---|---|---|---|---|
| 25 | Ta | 20 | TaC | 10 | FIG. 19 |
| 26 | $V_2O_5$ $B_4C$ | 20 5 | VC | 4 | — |
| 27 | $Cr_2O_3$ Al | 20 5 | $Cr_7C_3 + Cr_{23}C_6$ | 22 | — |
| 28 | $Nb_2O_5$ Al | 17 5 | NbC | 7 | — |
| 29 | $Ta_2O_5$ $B_4C$ | 20 3 | TaC | 8 | — |

Subsequently, the samples (Nos. 1, 3, 8, 20, and 22 to 26) were examined by the four-terminal method for the specific resistance of the surface layer formed thereon. The results are shown in Table 3. The layer of a nitride of vanadium or niobium and the layer of a carbide of vanadium, chromium, niobium, titanium, or tantalum gave a specific resistance of $4.2 \times 10^{-5}$ to $7.8 \times 10^{-4}$ Ω·cm, which suggests that the layer is electrically conductive unlike the substrate.

TABLE 3

| Substrate | Surface layer | Layer thickness (μm) | Specific resistance (Ω · cm) | Sample No. |
|---|---|---|---|---|
| $Si_3N_4$ | $(Si,B)_3N_4$ | 4 | $3.3 \times 10^{13}$ | 8 |
| | VN | 3 | $8.2 \times 10^{-5}$ | 1 |
| | NbN | 3 | $7.8 \times 10^{-5}$ | 3 |
| | BN | 5 | $1.7 \times 10^{13}$ | 20 |
| | Surface layer not formed. | | $4.2 \times 10^{13}$ | — |
| SiC | VC | 4 | $9.1 \times 10^{-5}$ | 26 |
| | $Cr_7C_3 + Cr_{23}C_6$ | 26 | $1.2 \times 10^{-4}$ | 22 |
| | NbC | 8 | $4.2 \times 10^{-5}$ | 23 |
| | (Si,Ti)C | 10 | $7.8 \times 10^{-4}$ | 24 |
| | TaC | 10 | $8.4 \times 10^{-5}$ | 25 |
| | Surface layer not formed. | | $1.8 \times 10^{2}$ | — |

The above-mentioned samples, Nos. 1, 3, and 20, were immersed in hydrofluoric acid at 80° C. for 8 hours to compare the weight loss by corrosion with that of the uncoated silicon nitride substrate. The results are shown in Table 4. It is noted that the compact nitride layer reduces the weight loss because it prevents the corrosion of the intergranular glass phase.

TABLE 4

| Sample No. | Surface layer | Weight loss (mg/cm$^2$) |
|---|---|---|
| 1 | VN | 7.222 |
| 3 | NbN | 9.301 |
| 20 | BN | 5.900 |
| — | Not coated | 12.500 |

EXAMPLE 2

Figure 22:
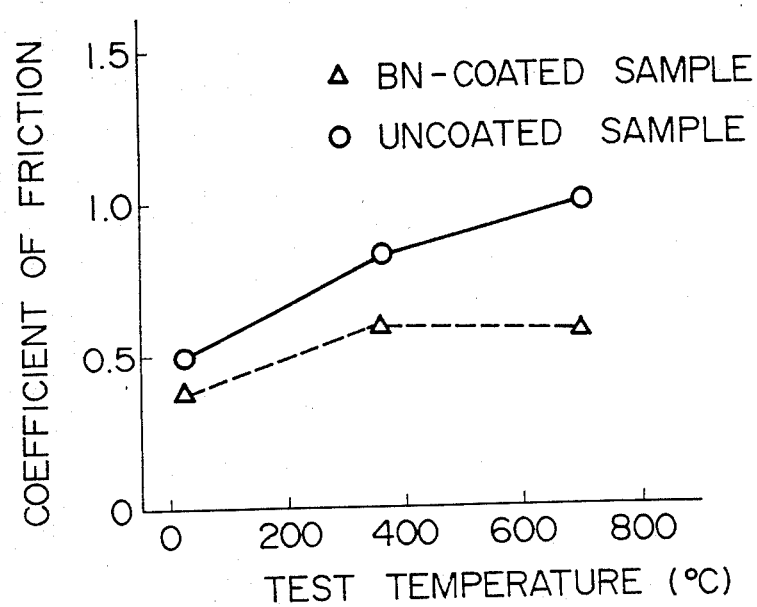
FIG. 22 is a diagram showing the coefficient of friction obtained by the friction test in Example 2.
Figure 23:
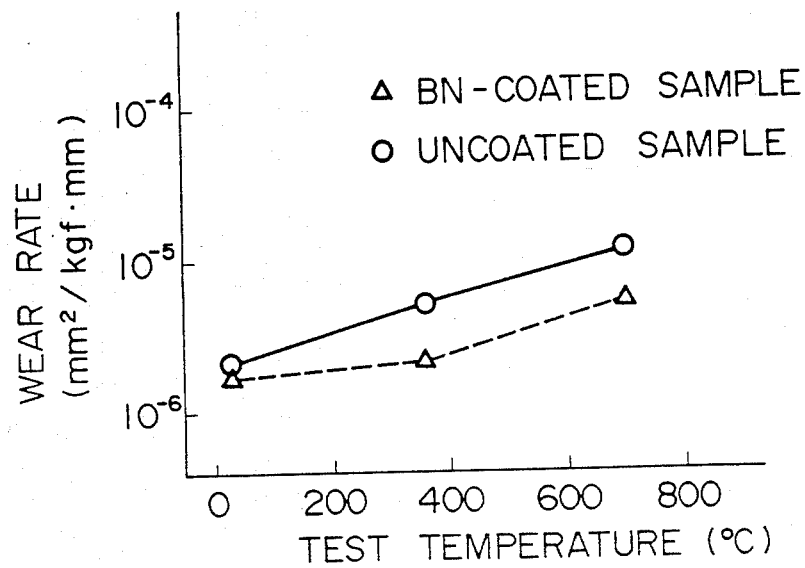
FIG. 23 is a diagram showing the wear rate obtained by the friction test in Example 2.

A plate test piece of silicon nitride formed by sintering under normal pressure, measuring $25 \times 25 \times 10$ mm, was immersed in a treating bath containing molten borax and 10 wt % (based on the total amount of bath agent) each of Fe-Mn and Fe-Al, at 1000° C. for 6 hours, so that the test piece was coated with a BN layer 5 μm thick. The coefficient of friction and the wear rate of the sample were measured by sliding the sample over the surface of $Si_3N_4$ using a thrust collar type tester under the following conditions. Load: 4.1 kgf; slide speed: 0.2 m/s; slide distance: 120 m; and test temperatures: room temperature, 360° C., and 700° C. The results are shown in FIGS. 22 and 23. The data of the Bn-coated sample is plotted with triangle marks, and the data of the uncoated sample (comparative example) is plotted with circle marks. The BN-coated sample has a lower coefficient of friction than the uncoated sample, and the coefficient of friction of the BN-coated sample does not abruptly increase with temperature. In addition, the BN-coated sample has a lower wear rate than the uncoated sample. This shows the lubricating action of the BN coating.

What is claimed is:

1. A method for surface treatment which comprises the steps of:
   preparing a molten salt bath by heating and melting a bath agent comprising boron oxide and/or borate and at least one member selected from the group consisting of a metallic element and a substance containing at least one metallic element, the metallic element being a Group IVa element, a Group Va element, a Group VIa element, calcium, manganese, boron, aluminum, silicon, magnesium, or a rare earth element, and
   immersing an article made of silicon nitrite, silicon carbide or sialon in said molten salt bath,
   thereby forming a surface layer of a carbide or nitride of said metallic element or of boron nitride on the surface of said article.

2. A method according to claim 1, wherein said metallic element is vanadium and/or niobium, and a surface layer of a nitride of said metallic element is formed on the surface of an article made of silicon nitride or sialon.

3. A method according to claim 1, wherein said metallic element is at least one member selected from the group consisting of titanium, a Group Va element, and chromium, and a surface layer of a carbide of said metallic element is formed on the surface of an article made of silicon carbide.

4. A method according to claim 1, wherein said metallic element is at least one member selected from the group consisting of a Group IVa element, tantalum, molybdenum, tungsten, chromium, calcium, manganese, boron, aluminum, silicon, magnesium, and a rare earth element, and a surface layer of boron nitride is formed on the surface of an article made of silicon nitride or sialon.

5. A method according to claim 1, wherein said borate is at least one member selected from the group consisting of anhydrous borax, anhydrous potassium borate, and anhydrous lithium borate.

6. A method according to claim 1, wherein said substance containing at least one of said metallic elements is an oxide, and the molten bath further comprises a reducing agent for reducing said oxide to a metallic element is further added.

7. A method according to claim 6, wherein said reducing agent is at least one member selected from the group consisting of oxygen-free calcium, aluminum, silicon, titanium, zirconium, manganese, boron, magnesium, a rare earth element, and a compound of any of the foregoing.

8. A method according to claim 1, wherein the amount of said at least one material is from 1 to 50 wt % based on the total amount of the bath agent.

9. A method according to claim 6, wherein the amount of said oxide and said reducing agent is from 1 to 60 wt % based on the total amount of the bath agent.

10. A method according to claim 7, wherein said reducing agent is from boron and the amount of said reducing agent is 7 to 40 wt % based on the amount of said oxide.

11. A method according to claim 7, wherein said reducing agent is from other than boron and the amount of said reducing agent is 20 to 95 wt % based on the amount of said oxide.

12. A method according to claim 1, wherein said article is from immersed in the molten salt bath at a bath temperature of 850° to 1100° C.

13. A method according to claim 1, wherein said metallic element is a Group IVa element.

14. A method according to claim 1, wherein said metallic element is a Group VIa element.

15. A method according to claim 1, wherein said metallic element is calcium.

16. A method according to claim 1, wherein said metallic element is manganese.

17. A method according to claim 1, wherein said metallic element is boron.

18. A method according to claim 1, wherein said metallic element is aluminum.

19. A method according to claim 1, wherein said metallic element is silicon.

20. A method according to claim 1, wherein said metallic element is magnesium.

21. A method according to claim 1, wherein said metallic element is a Group Va element.

* * * * *

UNITED STATES PATENT AND TRADEMARK OFFICE
CERTIFICATE OF CORRECTION

PATENT NO. : 4,794,044

DATED : December 27, 1988

INVENTOR(S) : Tohru ARAI and Hatsuhiko OHIKAWA

It is certified that error appears in the above-identified patent and that said Letters Patent is hereby corrected as shown below:

Column 8, line 54, "ment is further added" should read --ment--; line 68, "from boron" should read --boron--. Column 9, line 1, "agent is" should read --agent is from--; line 4 (claim 11, line 2), "from other" should read --other--; line 5, "agent is" should read --agent is from--; line 8 (claim 12, line 2), "article is from" should read --article is--; line 9, "temperature of" should read --temperature of from--.

Signed and Sealed this

Thirtieth Day of May, 1989

Attest:

DONALD J. QUIGG

*Attesting Officer*    *Commissioner of Patents and Trademarks*